US012640774B2

(12) United States Patent
Arashiro

(10) Patent No.: US 12,640,774 B2
(45) Date of Patent: May 26, 2026

(54) POWER SUPPLY SYSTEM, BRANCHING APPARATUS, AND POWER SUPPLY METHOD

(71) Applicant: NEC Corporation, Tokyo (JP)

(72) Inventor: Andre Arashiro, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/726,169

(22) PCT Filed: Jan. 21, 2022

(86) PCT No.: PCT/JP2022/002174
§ 371 (c)(1),
(2) Date: Jul. 2, 2024

(87) PCT Pub. No.: WO2023/139747
PCT Pub. Date: Jul. 27, 2023

(65) Prior Publication Data
US 2025/0070820 A1      Feb. 27, 2025

(51) Int. Cl.
*H04B 3/44*          (2006.01)
*H01B 7/14*          (2006.01)

(52) U.S. Cl.
CPC ................. *H04B 3/44* (2013.01); *H01B 7/14* (2013.01)

(58) Field of Classification Search
CPC .................................... H04B 3/44; H01B 7/14
USPC ....................................................... 340/425.2
See application file for complete search history.

(56) References Cited

U.S. PATENT DOCUMENTS

| | | | | |
|---|---|---|---|---|
| 6,895,187 B1 * | 5/2005 | Webb | ................. | H04Q 11/0005 398/104 |
| 2002/0126435 A1 * | 9/2002 | Pirovano | .................. | H04B 3/44 361/191 |
| 2003/0230936 A1 * | 12/2003 | Muramatsu | .............. | H04B 3/44 307/69 |
| 2007/0069588 A1 * | 3/2007 | Muramatsu | ............... | H02J 4/00 307/82 |

(Continued)

FOREIGN PATENT DOCUMENTS

| | | |
|---|---|---|
| JP | 2014-093539 A | 5/2014 |
| JP | 2016-504832 A | 2/2016 |

(Continued)

OTHER PUBLICATIONS

International Search Report for PCT Application No. PCT/JP2022/002174, mailed on Apr. 12, 2022.

*Primary Examiner* — Omar Casillashernandez
(74) *Attorney, Agent, or Firm* — Sughrue Mion, PLLC

(57) ABSTRACT

A power supply system (1001) according to the present disclosure supplies power to a relay apparatus (2) on a branching submarine cable branched from a trunk submarine cable by a branching apparatus (1). The power supply system (1001) according to the present disclosure supplies power to the relay apparatus (2) by a branching power supply path (BE) connected to a trunk power supply path (TE) provided in a trunk submarine cable. When power is supplied to the relay apparatus (2), the branching power supply path (BE) causes a current flowing from one side of the trunk submarine cable to flow to the relay apparatus (2), and then causes the current to turns back so that the current flows to the other side of the trunk submarine cable.

7 Claims, 5 Drawing Sheets

(56)  References Cited

U.S. PATENT DOCUMENTS

2014/0103739 A1 *  4/2014  Takigawa ................. H04B 3/44
                                                  307/112
2016/0294482 A1 *  10/2016  Michel ................... H04B 10/29
2020/0257251 A1 *  8/2020  Takigawa ................ G05B 9/02

FOREIGN PATENT DOCUMENTS

JP         2020-174517  A     10/2020
WO         2016/092806  A1      6/2016
WO         2020/261924  A1     12/2020

* cited by examiner

9001

9002

POWER SUPPLY SYSTEM, BRANCHING APPARATUS, AND POWER SUPPLY METHOD

This application is a National Stage Entry of PCT/JP2022/002174 filed on Jan. 21, 2022, the contents of all of which are incorporated herein by reference, in their entirety.

TECHNICAL FIELD

The present invention relates to a power supply system, a branching apparatus, and a power supply method.

BACKGROUND ART

The submarine cable can be branched by a branching apparatus. Patent Literatures 1 to 3 disclose a submarine cable system including a power supply path for supplying power to a relay inserted into a branched submarine cable.

In the submarine cable system disclosed in Patent Literatures 1 to 3, a landing station is provided at an end of the branched submarine cable, and power is supplied from the landing station to a relay apparatus on the branched submarine cable.

CITATION LIST

Patent Literature

Patent Literature 1: Japanese Unexamined Patent Application Publication No. 2014-093539
Patent Literature 2: International Patent Publication No. WO2016/092806
Patent Literature 3: International Patent Publication No. WO2020/261924

SUMMARY OF INVENTION

Technical Problem

In the submarine cable system disclosed in Patent Literatures 1 to 3, in order to supply power to the relay apparatus on the branched submarine cable, it is necessary to provide the landing station at the end of the branched submarine cable, and there is a problem that equipment required for relay apparatus power supply becomes complicated.

In addition, when the branched submarine cable is connected to the submarine cable at both ends, that is, when the two systems of submarine cables are connected by the branched submarine cable, there is also a problem that power cannot be supplied to the relay apparatus on the branched submarine cable.

The present disclosure has been made to solve such a problem, and an object thereof is to provide a power supply system, a branching apparatus, and a power supply method capable of simplifying equipment for supplying power to a relay apparatus on a branched submarine cable.

Solution to Problem

A power supply system according to the present disclosure is a power supply system that supplies power to a relay apparatus on a branching submarine cable branched from a trunk submarine cable by a branching apparatus, in which power is supplied to the relay apparatus by a branching power supply path connected to a trunk power supply path provided in the trunk submarine cable, and when power is supplied to the relay apparatus on the branching submarine cable, the branching power supply path causes a current flowing from one side of the trunk power supply path to flow to the relay apparatus, and then causes the current to turn back so that the current flows to the other side of the trunk power supply path.

A branching apparatus according to the present disclosure is a branching apparatus for branching a branching submarine cable from a trunk submarine cable, in which a trunk power supply path provided in the trunk submarine cable and a branching power supply path that supplies power to a relay apparatus on the branching submarine cable are connected, and when power is supplied to the relay apparatus on the branching submarine cable, a current flowing from one side of the trunk power supply path flows to the relay apparatus, and a current flowing from the relay apparatus flows to the other side of the trunk power supply path.

A power supply method according to the present disclosure is a power supply method for supplying power to a relay apparatus on a branching submarine cable branched from a trunk submarine cable by a branching apparatus, in which power is supplied to the relay apparatus by a branching power supply path connected to a trunk power supply path provided in the trunk submarine cable, and when power is supplied to the relay apparatus on the branching submarine cable, the branching power supply path causes a current flowing from one side of the trunk power supply path to flow to the relay apparatus, and then causes the current to turn back so that the current flows to the other side of the trunk power supply path.

Advantageous Effects of Invention

According to the present disclosure, it is possible to provide a power supply system, a branching apparatus, and a power supply method capable of simplifying equipment for supplying power to a relay apparatus on a branched submarine cable.

EXAMPLE EMBODIMENT

Background of Occurrence of Problem According to Present Disclosure

<Power Supply System to Relay Apparatus on Submarine Cable>

Hereinafter, circumstances in which the problem according to the present disclosure occurs will be described with reference to the drawings.

Figure 5:
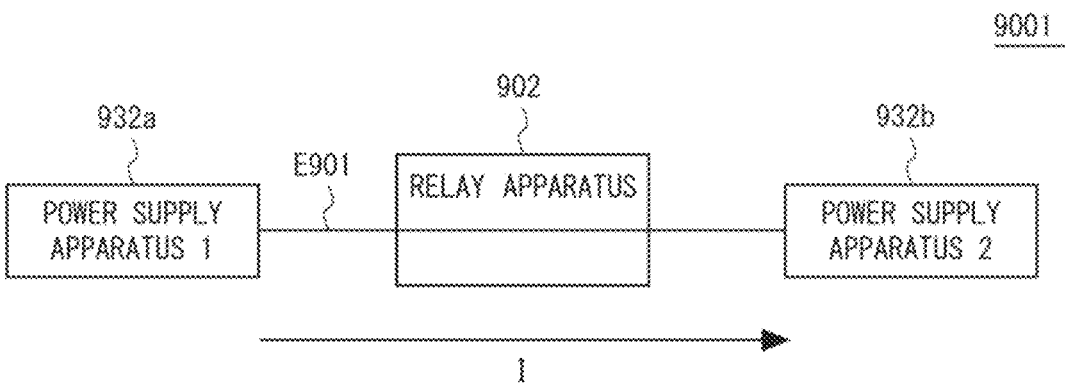
FIG. 5 is a block diagram illustrating a configuration of a power supply system according to a related art.

FIG. 5 is a block diagram illustrating a configuration of a power supply system according to a related art.

A power supply system 9001 according to the related art is a power supply system that supplies power to a relay apparatus on a submarine cable, and includes a power supply path E901, a power supply apparatus 932*a* and a power supply apparatus 932*b*, and the relay apparatus 902.

The power supply apparatuses 932*a* and 932*b* are apparatuses installed in a landing station of a submarine cable, and are apparatuses for outputting electric power. The power supply apparatus 932*a* and the power supply apparatus 932*b* are connected to ends of the power supply path E901, respectively. The power supply apparatuses 932*a* and 932*b* apply voltages having different reference signs to the ends of the power supply path E901 to cause a direct current to flow through the power supply path E901.

Hereinafter, the power supply apparatus 932*a* and the power supply apparatus 932*b* will be referred to as a power supply apparatus 932 unless it is particularly necessary to distinguish them.

The power supply path E901 is a conductive wire provided in the submarine cable. The power supply apparatus 932 is connected to both end portions of the power supply path E901, and the relay apparatus 902 is inserted into the power supply path E901.

The power supply path E901 receives application of voltages having different signs to both ends by the power supply apparatus 932. A direct current flows through the power supply path E901 to which a voltage is applied at both ends.

The power supply path E901 supplies the direct current to the relay apparatus 902 to supply power.

The relay apparatus 902 is an apparatus to be inserted into a submarine cable, and is connected to the power supply path E901. The relay apparatus 902 receives power supply from the direct current supplied from the power supply path E901.

As described above, in the power supply system 9001 according to the related art, the power supply apparatus 932 applies a voltage to the power supply path E901 to cause a constant current to flow. Then, the relay apparatus 902 acquires power from the constant current flowing through the power supply path E901.

<Power Supply System to Relay Apparatus on Branched Submarine Cable>

Figure 6:
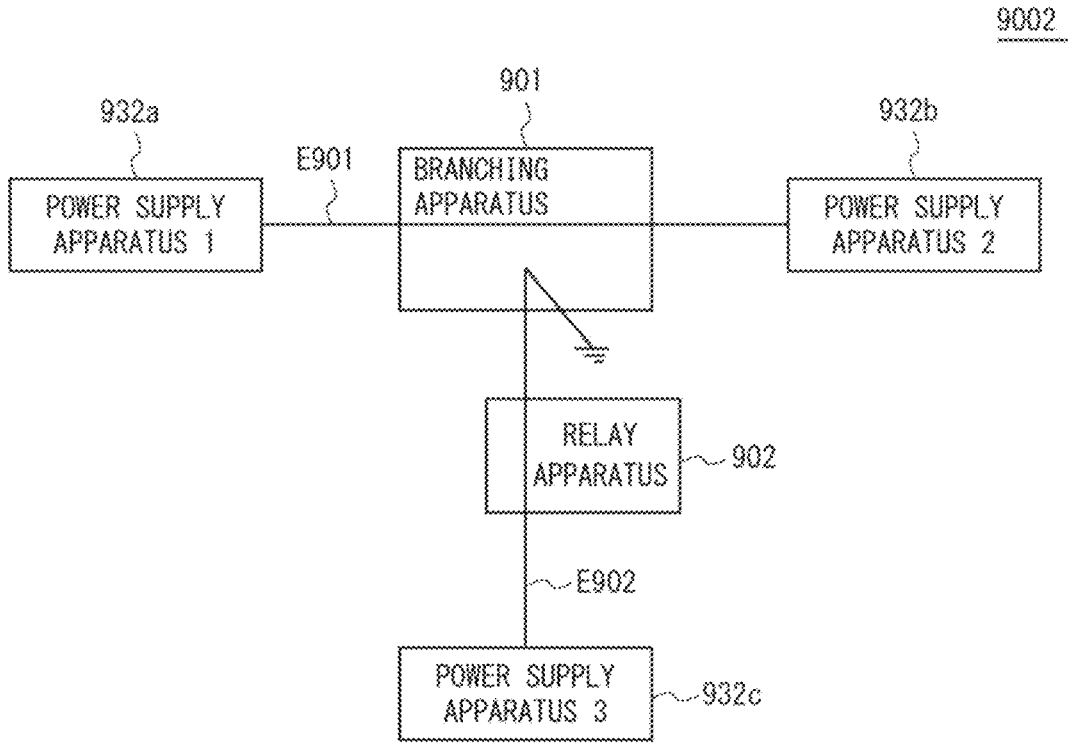
FIG. 6 is a block diagram illustrating a configuration of a power supply system according to a related art.

Next, a power supply system to a relay apparatus on a branched submarine cable according to the related art will be described. FIG. 6 is a block diagram illustrating a configuration of the power supply system according to a related art.

A power supply system 9002 according to the related art is a power supply system that supplies power to a relay apparatus on a branched submarine cable, and includes power supply paths E901 and E902, power supply apparatuses 932*a* to 932*c*, a branching apparatus 901, and a relay apparatus 902.

The power supply apparatuses 932*a* to 932*c* are apparatuses installed in a landing station of a submarine cable, and are apparatuses that output power. The power supply apparatus 932*a* and the power supply apparatus 932*b* are connected to ends of the power supply path E901, respectively. The power supply apparatuses 932*a* and 932*b* apply voltages having different signs to the ends of the power supply path E901, respectively, to cause a direct current to flow through the power supply path E901.

Meanwhile, the power supply apparatus 932*c* is connected to the end of the power supply path E902, applies a voltage to the end of the power supply path E901, and causes a direct current to flow through the power supply path E902.

The power supply path E901 is a conductive wire provided in the submarine cable. Both end portions of the power supply path E901 are connected to the power supply apparatuses 932*a* and 932*b*, respectively.

Although not illustrated for the sake of simplicity, a relay apparatus having the same aspect as the relay apparatus 902 is inserted into the power supply path E901.

The power supply path E901 receives application of voltages having different signs from the power supply apparatuses 932*a* and 932*b* to both ends. A direct current flows through the power supply path E901 to which the voltage is applied.

The power supply path E901 supplies the direct current to the relay apparatus to supply power.

The power supply path E902 is a conductive wire provided in a submarine cable branching and extending from the submarine cable including the power supply path E901. One end of the power supply path E902 is connected to the power supply apparatus 932*c*, and the other end thereof is grounded via the branching apparatus 901.

The power supply path E902 receives application of a voltage to one end from the power supply apparatus 932*c*. A direct current flows through the power supply path E902 to which the voltage is applied.

The power supply path E902 supplies the direct current to the relay apparatus 902 to supply power.

The branching apparatus 901 is an apparatus inserted into a submarine cable, and is an apparatus for branching the submarine cable. The branching apparatus 901 is connected to the power supply paths E901 and E902, and earth-connects one end of the power supply path E902.

The relay apparatus 902 is an apparatus inserted into the branched submarine cable and is connected to the power supply path E902. The relay apparatus 902 acquires power from the constant current supplied from the power supply path E902.

As described above, the power supply system 9002 according to the related technology connects the power supply apparatus 932*c* to the end of the grounded power supply path E902 and supplies power to the relay apparatus 902 on the branched submarine cable.

That is, in the power supply system 9002 according to the related technology, it is necessary to connect the power supply apparatus to the end of the branched submarine cable, which leads to complication of the power supply facility. Furthermore, since it is necessary to provide a landing station accommodating a power supply apparatus at the end of the branched submarine cable, there is also a problem that the two systems of submarine cables cannot be connected by the branched submarine cable.

Outline of Example Embodiment

Therefore, in the power supply system according to the present disclosure, power is supplied to the relay apparatus on the branched submarine cable by the branching power supply path connected to the trunk power supply path provided in the submarine cable. When supplying power to the relay apparatus on the branched submarine cable, the branching power supply path causes the current flowing from one side of the trunk power supply path to flow to the relay apparatus, and then causes the current to turn back so that the current flows to the other side of the trunk power supply path.

With such a configuration, it is possible to supply power to the relay apparatus on the branched submarine cable without providing the landing station at the terminal of the branched submarine cable, and thus, it is possible to simplify equipment for supplying power to the relay apparatus. As a result, two systems of submarine cables can be connected by the branched submarine cable.

First Example Embodiment

Hereinafter, a first example embodiment of the present disclosure will be described with reference to the drawings.

Figure 1:
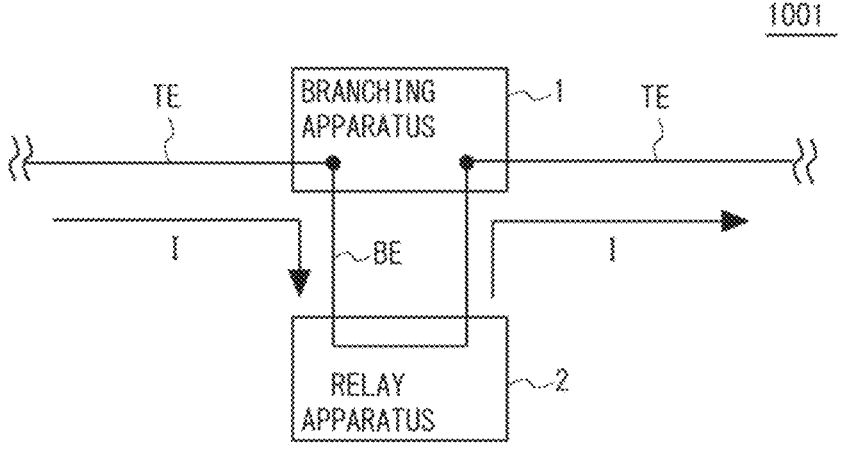
FIG. 1 is a block diagram illustrating a configuration of a power supply system according to a first example embodiment.

FIG. 1 is a block diagram illustrating a configuration of a power supply system according to the first example embodiment.

A power supply system 1001 according to the first example embodiment is a power supply system that supplies power to a relay apparatus on a branching submarine cable branched by a branching apparatus from a trunk submarine cable.

However, the trunk submarine cable referred to herein refers to a submarine cable having both ends connected to the landing station. In addition, the branching submarine cable refers to a submarine cable in which one or both ends are connected to a branching apparatus provided on the trunk submarine cable.

The power supply system 1001 includes a branching apparatus 1, a relay apparatus 2, a trunk power supply path TE, and a branching power supply path BE.

The branching apparatus 1 is an apparatus to be inserted into a trunk submarine cable, and branches the branching submarine cable from the trunk submarine cable.

The relay apparatus 2 is an apparatus to be inserted into the branching submarine cable, and is connected to the branching power supply path BE. The relay apparatus 2 acquires power from the current supplied from the branching power supply path BE.

The trunk power supply path TE is a conductive wire that is provided in the trunk submarine cable and through which a current flows. The trunk power supply path TE is connected to the branching power supply path BE.

When supplying power to the relay apparatus 2, the trunk power supply path TE causes the current I flowing from one side of the trunk power supply path TE to flow to the branching power supply path BE. In addition, the trunk power supply path TE causes the current I flowing from the branching power supply path BE to flow to the other side of the trunk power supply path TE.

The branching power supply path BE is a conductive wire which is provided in the branching submarine cable and through which a current flows. The branching power supply path BE is connected to the trunk power supply path TE.

The branching power supply path BE causes the current I flowing from the trunk power supply path TE to flow to the relay apparatus 2 and supplies the current I to the relay apparatus 2. The branching power supply path BE turns back after supplying power to the relay apparatus 2, and causes the current I to flow to the other side of the trunk power supply path TE.

As described above, the power supply system 1001 according to the present example embodiment supplies power to the relay apparatus 2 by the branching power supply path BE connected to the trunk power supply path TE provided in the submarine cable. In the case of supplying power to the relay apparatus 2, the branching power supply path BE causes the current I flowing from one side of the trunk power supply path TE to flow to the relay apparatus 2, and then causes the current to turn back so that the current flows to the other side of the trunk power supply path TE.

With such a configuration, the power supply system 1001 according to the present example embodiment can supply power to the relay apparatus inserted into the branching submarine cable even when the terminal of the branching submarine cable on the side to which the branching apparatus is not connected is not connected to the power supply apparatus.

As a result, the power supply system 1001 according to the present example embodiment can simplify equipment for supplying power to the relay apparatus on the branched submarine cable. In addition, power can also be supplied to the relay apparatus on the branching submarine cable in which both ends branch from two different systems of trunk submarine cables.

Second Example Embodiment

<Configuration of Submarine Cable System>
Hereinafter, a second example embodiment of the present disclosure will be described with reference to the drawings.

A power supply system according to the present example embodiment is a power supply system that supplies power to a relay apparatus of a branching submarine cable system.

First, a configuration of a submarine cable system into which the power supply system according to the present example embodiment is introduced will be described in detail.

Figure 2:
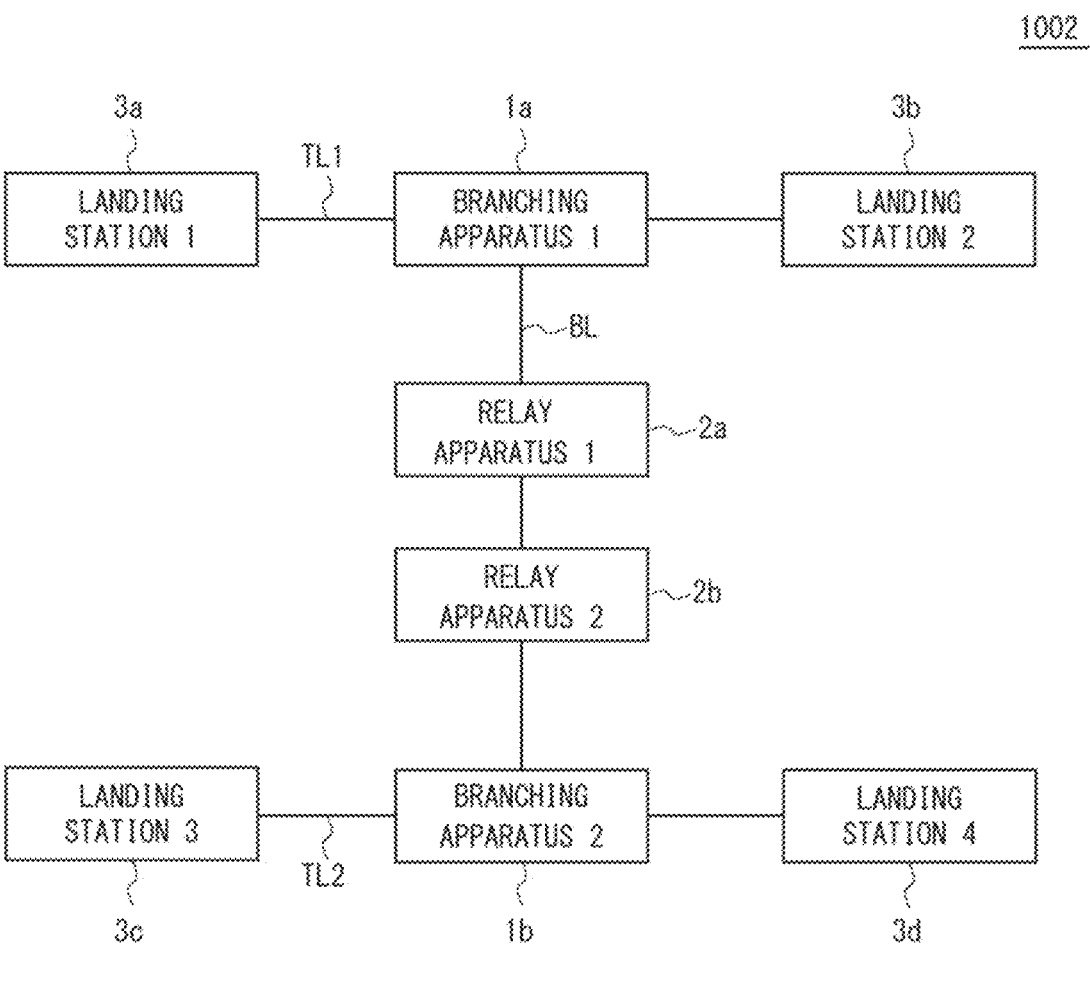
FIG. 2 is a block diagram illustrating a configuration of a submarine cable system according to a second example embodiment.

FIG. 2 is a block diagram illustrating a configuration of a submarine cable system according to the second example embodiment.

A submarine cable system 1002 according to the present example embodiment connects landing stations by a submarine cable and transmits information between the landing stations.

The submarine cable system 1002 includes two systems of trunk submarine cables, and the two systems of trunk submarine cables are connected by one system of branching submarine cables.

Note that the submarine cable system to which the power supply system according to the present example embodiment can be applied is not limited to the system including two systems of trunk submarine cables and one system of branching submarine cables. The power supply system according to the present example embodiment may be introduced into any submarine cable system as long as the system is a submarine cable system including at least one or more trunk submarine cables and branching submarine cables.

However, according to the power supply system according to the present example embodiment, power can be supplied to the relay apparatus on the branching submarine cable without providing the landing station at the terminal of the branching submarine cable.

Therefore, when the power supply system according to the present example embodiment is introduced into the submarine cable system including the branching submarine cable having both ends connected to the trunk submarine cable, such as the submarine cable system 1002, the power supply system according to the present example embodiment has a particular effect.

The submarine cable system 1002 includes branching apparatuses 1a and 1b, relay apparatuses 2a and 2b, landing stations 3a to 3d, trunk submarine cables TL1 and TL2, and a branching submarine cable BL.

Hereinafter, the landing stations 3a to 3d will be referred to as a landing station 3 unless it is particularly necessary to distinguish between them. In addition, the trunk submarine cables TL1 and TL2 will be referred to as a trunk submarine cable TL unless it is particularly necessary to distinguish between them. Further, the branching apparatuses 1a and 1b will be referred to as a branching apparatus 1 unless it is particularly necessary to distinguish between them, and the relay apparatuses 2a and 2b will be referred to as a relay apparatus 2 unless it is particularly necessary to distinguish between them.

The landing station 3 is a facility connected to either end of the trunk submarine cables TL1 and TL2.

In the present example embodiment, the landing stations 3a and 3b are connected to the end of the trunk submarine cable TL1, and the landing stations 3c and 3d are connected to the end of the trunk submarine cable TL2.

The landing station 3 performs information communication with another landing station 3 via a submarine cable. The landing station 3 includes a transmission apparatus for transmitting information and a power supply apparatus for supplying power to a relay apparatus on a submarine cable.

Note that the number of submarine cables extending from one landing station 3 is not limited to one, and two or more submarine cables may extend from one landing station. That is, the landing station 3 may be a facility that relays a plurality of submarine cables.

The trunk submarine cable TL is a cable to be laid on the sea floor, and connects the two landing stations 3. The trunk submarine cable TL includes a trunk transmission path for transmitting information transmitted from the landing station 3 and a trunk power supply path for supplying power to a relay apparatus on the submarine cable.

The branching apparatus 1 is inserted into the trunk submarine cable TL. The trunk submarine cable TL is branched from the branching submarine cable BL by the branching apparatus 1. In other words, the trunk submarine cable TL is connected to the branching submarine cable BL via the branching apparatus 1.

One or more relay apparatuses (not illustrated) may be inserted into the trunk submarine cable TL.

When a relay apparatus (not illustrated) is inserted into the trunk submarine cable TL, the relay apparatus is typically an apparatus having a function of amplifying a signal transmitted by the trunk submarine cable TL, and receives power supply from a trunk power supply path included in the trunk submarine cable TL.

The branching submarine cable BL is a cable to be laid on the sea floor, and is a cable branching from the trunk submarine cable TL by the branching apparatus 1. One end of the branching submarine cable BL branches from the trunk submarine cable TL1, and the other end branches from the trunk submarine cable TL1. That is, the branching submarine cable BL connects the trunk submarine cable TL1 and the trunk submarine cable TL2.

The branching submarine cable BL includes a branching transmission path for transmitting information and a branching power supply path for supplying power to the relay apparatus 2.

The branching apparatus 1 is an apparatus inserted into the trunk submarine cable TL, and branches the branching submarine cable BL from the trunk submarine cable TL. In other words, the branching apparatus 1 is an apparatus that connects the trunk submarine cable TL and the branching submarine cable BL.

The branching apparatus 1 connects a trunk information transmission path included in the trunk submarine cable TL and a branching information transmission path included in the branching submarine cable BL. In addition, the branching apparatus 1 may connect or disconnect the trunk information transmission path and the branching information transmission path on the basis of control from the landing station 3.

The branching apparatus 1 connects a trunk power supply path included in the trunk submarine cable TL and a branching power supply path included in the branching submarine cable BL. In addition, the branching apparatus 1 may connect or disconnect the trunk power supply path and the branching power supply path, for example, on the basis of control from the landing station 3.

The branching apparatus 1 may connect the branching power supply path to only one of the trunk power supply paths included in the trunk submarine cables TL1 and TL2.

The relay apparatus 2 is an apparatus to be inserted into the branching submarine cable BL. The relay apparatus 2 typically has a function of amplifying a signal transmitted by the branching submarine cable BL. For example, when the branching submarine cable transmits information by optical transmission, the relay apparatus 2 amplifies the attenuated optical signal to a predetermined intensity as it travels in the branching submarine cable.

Although two relay apparatuses 2 are illustrated in FIG. 2, the number of relay apparatuses 2 included in the present example embodiment is not limited to two, and may be any number as long as it is one or more. The relay apparatus 2 may be determined based on a value such as an attenuation degree of a signal flowing through the branching submarine cable BL or a length of the branching submarine cable BL.

The relay apparatus 2 acquires a current from a branching power supply path included in the branching submarine cable BL and receives power supply.

<Configuration of Transmission System>

Next, an information transmission system included in the submarine cable system 1002 will be described.

Figure 3:
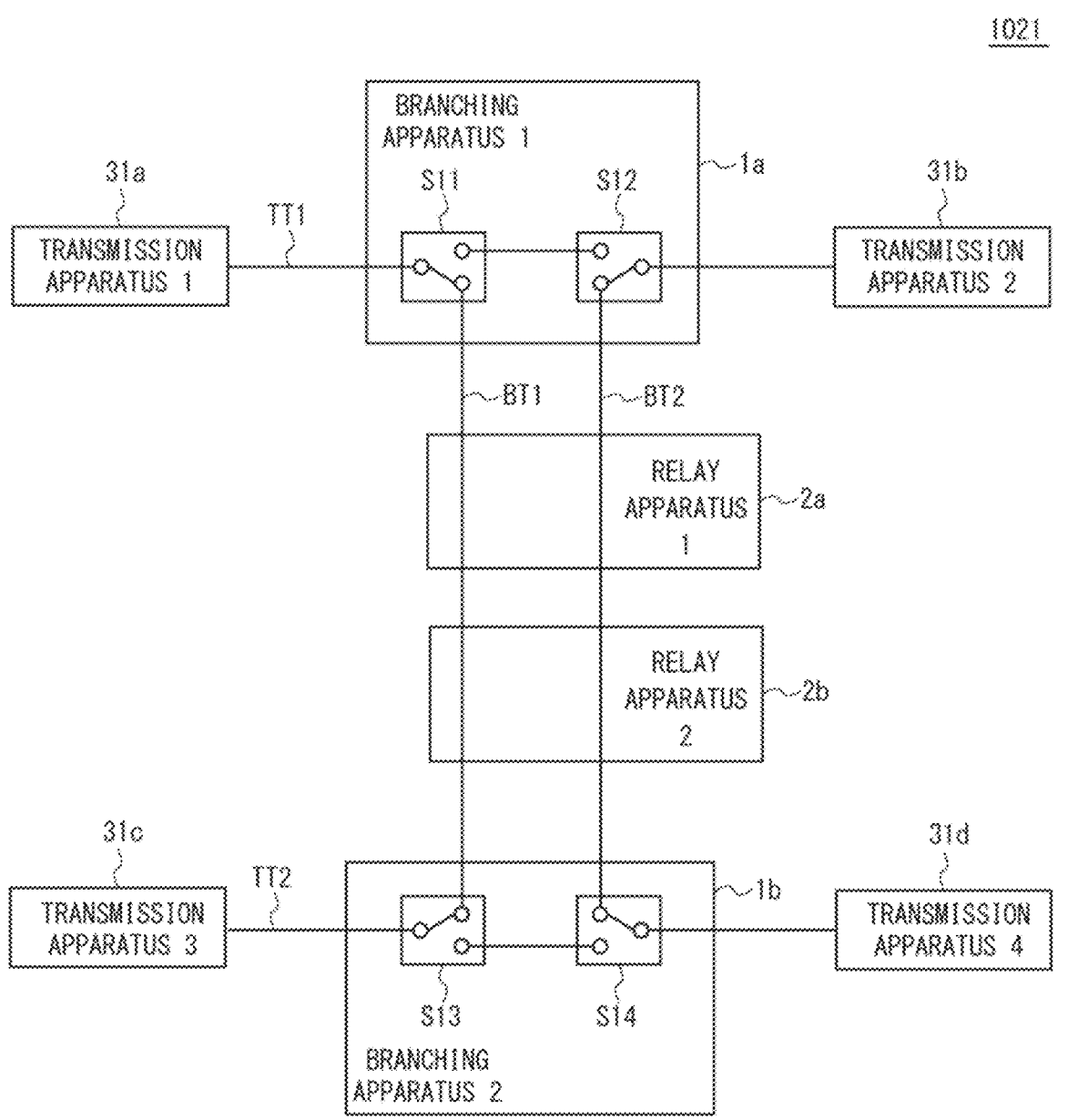
FIG. 3 is a block diagram illustrating a configuration of an information transmission system according to the second example embodiment.

FIG. 3 is a block diagram illustrating a configuration of an information transmission system according to a second example embodiment.

Note that FIG. 2 will be appropriately referred to in the following description.

The information transmission system 1021 is a system for transmitting information between the landing stations 3, and for example, transmits information by optical communication.

The information transmission system 1021 includes transmission apparatuses 31a to 31d, trunk transmission paths TT1 and TT2, branching transmission paths BT1 and BT2, and switch circuits S11 to S14.

Hereinafter, the transmission apparatuses 31*a* to 31*d* will be referred to as a transmission apparatus 31 unless it is particularly necessary to distinguish between them. In addition, the trunk transmission paths TT1 and TT2 will be referred to as a trunk transmission path TT unless it is particularly necessary to distinguish between them, and the branching transmission paths BT1 and BT2 will be referred to as a branching transmission path BT unless it is particularly necessary to distinguish between them. Further, the switch circuits S11 to S14 will be referred to as a switch circuit S1 unless it is particularly necessary to distinguish between them.

The transmission apparatus 31 is an apparatus included in the landing station 3, and communicates with another transmission apparatus 31 via the trunk transmission path TT or via the trunk transmission path TT and the branching transmission path BT.

Typically, the transmission apparatus 31 is an optical communication apparatus that outputs and transmits or receives an optical signal, but is not limited thereto, and may be, for example, an apparatus that outputs and transmits or receives an electric signal.

In the present example embodiment, the transmission apparatus 31*a* and the transmission apparatus 31*b* are connected by the trunk transmission path TT1, and the transmission apparatus 31*c* and the transmission apparatus 31*d* are connected by the trunk transmission path TT2.

The trunk transmission path TT1 and the trunk transmission path TT2 are communication lines included in the trunk submarine cables TL1 and TL2, respectively. The trunk transmission path TT is typically an optical fiber that transmits an optical signal, but is not limited thereto, and may be, for example, a conductive wire that transmits an electric signal.

The branching apparatus 1 is inserted into the trunk transmission path TT. The trunk transmission path TT is connected to the branching transmission path BT via the switch circuit S1 in the branching apparatus 1.

Further, a relay apparatus may be inserted into the trunk transmission path TT. When the relay apparatus is inserted into the trunk transmission path TT, the signal transmitted by the trunk transmission path TT is amplified by the relay apparatus.

The branching transmission path BT is a communication line included in the branching submarine cable BL. The branching transmission path BT is typically an optical fiber that transmits an optical signal, but is not limited thereto, and may be, for example, a conductive wire that transmits an electric signal.

At least one end of the branching transmission path BT is connected to the branching apparatus 1. The branching transmission path BT is connected to the trunk transmission path TT via the switch circuit S1 in the branching apparatus 1.

In the present example embodiment, the branching transmission path BT1 connects the trunk transmission path TT1 on the side to which the transmission apparatus 31*a* is connected and the trunk transmission path TT2 on the side to which the transmission apparatus 31*c* is connected via the switch circuit S1.

In the present example embodiment, the branching transmission path BT2 connects the trunk transmission path TT1 on the side to which the transmission apparatus 31*b* is connected and the trunk transmission path TT2 on the side to which the transmission apparatus 31*d* is connected via the switch circuit S1.

Note that, although both ends of the branching transmission path BT in the present example embodiment are connected to the branching apparatuses 1*a* and 1*b*, only one end may be connected to the branching apparatus 1, and the other end may be connected to the transmission apparatus 31.

The relay apparatus 2 is inserted into the branching transmission path BT, and the signal transmitted by the branching transmission path BT is amplified by the relay apparatus.

Note that although the two relay apparatuses 2 are inserted into the branching transmission path BT according to the present example embodiment, the number of relay apparatuses 2 inserted into the branching transmission path BT is not limited thereto, and at least one or more relay apparatuses 2 may be inserted.

The switch circuit S1 is a switch circuit included in the branching apparatus 1, and connects the trunk transmission path TT and the branching transmission path BT.

In the present example embodiment, the switch circuits S11 and S12 are located on the trunk transmission path TT1, and the switch circuits S13 and S14 are located on the trunk transmission path TT2.

The switch circuit S11 connects the trunk transmission path TT1 and the branching transmission path BT1, and the switch circuit S12 connects the trunk transmission path TT1 and the branching transmission path BT2.

The switch circuit S13 connects the trunk transmission path TT2 and the branching transmission path BT1, and the switch circuit S14 connects the trunk transmission path TT2 and the branching transmission path BT2.

For example, the switch circuit S1 may connect or disconnect the trunk transmission path TT and the branching transmission path BT based on control from a control unit (not illustrated) of the branching apparatus 1.

For example, the switch circuits S11 and S12 may disconnect the connection between the trunk transmission path TT1 and the branching transmission path BT when the transmission apparatus 31*a* and the transmission apparatus 31*b* communicate with each other.

In addition, the switch circuits S13 and S14 may disconnect the connection between the trunk transmission path TT2 and the branching transmission path BT when the transmission apparatus 31*c* and the transmission apparatus 31*d* communicate with each other.

Further, the switch circuit S1 may connect the trunk transmission path TT and the branching transmission path BT when the transmission apparatus 31*a* and the transmission apparatus 31*c* communicate with each other or when the transmission apparatus 31*b* and the transmission apparatus 31*d* communicate with each other.

<Configuration of Power Supply System>

Next, a power supply system according to the present example embodiment will be described.

Figure 4:
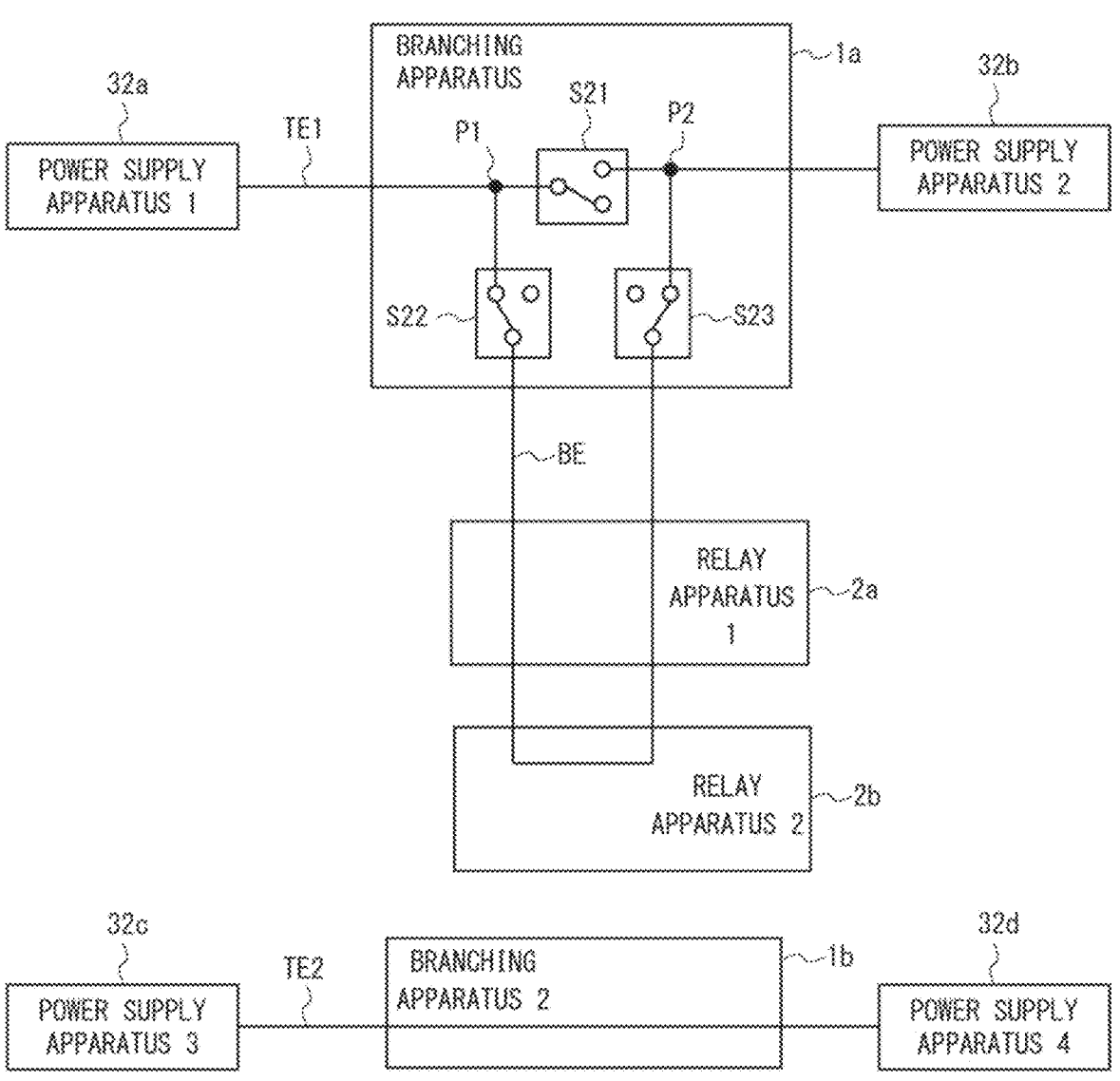
FIG. 4 is a block diagram illustrating a configuration of a power supply system according to the second example embodiment.

FIG. 4 is a block diagram illustrating a configuration of a power supply system according to the second example embodiment.

A power supply system 1022 is a power supply system included in the submarine cable system 1002, and is a power supply system that supplies power to the relay apparatus 2 on the branching submarine cable BL branched from the trunk submarine cable BL by the branching apparatus 1.

The power supply system 1022 includes power supply apparatuses 32*a* to 32*d*, trunk power supply paths TE1 and TE2, a branching power supply path BE, and switch circuits S21 to S23.

Hereinafter, the power supply apparatuses 32a to 32d will be referred to as a power supply apparatus 32 unless it is particularly necessary to distinguish between them. In addition, the trunk power supply paths TE1 and TE2 will be referred to as a trunk power supply path TE unless it is particularly necessary to distinguish between them. Further, the switch circuits S21 to S23 are referred to as a switch circuit S2 unless it is particularly necessary to distinguish between them.

The power supply apparatus 32 is an apparatus included in the landing station 3 and is an apparatus that outputs power. The power supply apparatus 32 is connected to the end of the trunk power supply path TE, applies a voltage to the end of the trunk power supply path TE, and causes a current to flow through the trunk power supply path TE. The power supply apparatus 32 is grounded to the sea floor.

In the present example embodiment, the power supply apparatuses 32a and 32b are connected to both ends of the trunk power supply path TE1, respectively, and voltages having different signs are applied to the respective ends of the trunk power supply path TE1. In addition, the power supply apparatuses 32c and 32d are connected to both ends of the trunk power supply path TE2, respectively, and voltages having different signs are applied to the respective ends of the trunk power supply path TEL.

With such a configuration, it is possible to reduce the magnitude of the voltage that needs to be applied by each power supply apparatus 32. In addition, even in a case where either one of the power supply apparatuses 32 connected to both ends of the trunk power supply path TE fails, it is possible to continuously flow the current to the trunk power supply path TE by increasing the voltage applied by the other power supply apparatus 32.

The number of the power supply apparatuses 32 connected to the one trunk power supply path TE is not limited to two, and may be one. That is, the power supply apparatus 32 may be connected to only one end of the trunk power supply path TE, and the power supply apparatus 32 may not be connected to the other end. In this case, the end on the side to which the power supply apparatus 32 is not connected is grounded to the sea floor.

The trunk power supply path TE is a conductive wire through which a current for supplying power to the relay apparatus (not illustrated) inserted into the trunk submarine cable, the relay apparatus 2 inserted into the branching submarine cable, or both of them flows, and both ends thereof are connected to the power supply apparatus 32.

Note that the trunk power supply path TE does not need to be one continuous conductive wire, and may be configured as a virtual path in which a plurality of conductive wires is connected via a circuit, an apparatus, or the like.

The trunk power supply path TE receives application of voltages having different signs to both ends from the power supply apparatus 32. A current flows through the trunk power supply path TE to which the voltage is applied. Note that the trunk power supply path TE may also supply current to the branching apparatus 1 to supply power.

The branching apparatus 1a is inserted into the trunk power supply path TE1. The trunk power supply path TE1 is connected to the branching power supply path BE in the branching apparatus 1. More specifically, the trunk power supply path TE1 is connected to the end of the branching power supply path BE via switch circuits S22 and S23 at two different points P1 and P2 on the trunk power supply path TE1.

Two points P1 and P2 on the trunk power supply path TE1 are connected via a switch circuit S21.

When power is supplied to the relay apparatus 2, the trunk power supply path TE1 causes the current flowing from one side of the trunk power supply path TE1 to flow to the branching power supply path BE, and causes the current flowing from the branching power supply path BE to the trunk power supply path TE1 to flow to the other side of the trunk power supply path TEL.

For example, when the power supply apparatus 32a applies a positive voltage to the trunk power supply path TE1 and the power supply apparatus 32b applies a negative voltage to the trunk power supply path TE1, the trunk power supply path TE1 causes the current flowing from the power supply apparatus 32a in the direction of the point P1 to flow to the branching power supply path BE via the switch circuit S22. Then, the current flowing from the branching power supply path BE in the direction of the point P2 via the switch circuit S23 flows in the direction in which the power supply apparatus 32b is connected.

The trunk power supply path TE2 is not connected to the branching power supply path BE. That is, the power supply system including the power supply apparatuses 32a and 32b, the trunk power supply path TE1, and the branching power supply path BE, and the power supply system including the power supply apparatuses 32c and 32d, and the trunk power supply path TE2 are independent of each other.

With such a configuration, for example, when a failure occurs in one of the power supply systems, the influence of the failure on the other power supply system can be reduced.

The branching power supply path BE is a conductive wire for flowing a current to be supplied to the relay apparatus 2, and both ends thereof are connected to two points P1 and P2 on the trunk power supply path TE1 via a switch circuit S2.

Note that the branching power supply path BE does not need to be one continuous conductive wire, and may be configured as a virtual path in which a plurality of conductive wires is connected via a circuit, an apparatus, or the like.

In addition, the branching power supply path BE may include a multi-cable including a conductive wire through which a current flowing from one side of the trunk power supply path TE1 to the relay apparatus 2 flows and a conductive wire through which a current flowing from the relay apparatus 2 to the other side of the trunk power supply path flows.

The relay apparatus 2 is inserted into the branching power supply path BE. The branching power supply path BE supplies a current to the relay apparatus 2 to supply power.

The branching power supply path BE extends from the trunk power supply path TE1 in the direction of the relay apparatus 2, is turned back via all the relay apparatuses 2 fed by the branching power supply path BE, and returns to the trunk power supply path TE1 via the relay apparatus 2 again.

Here, the branching power supply path BE may be turned back inside the last relay apparatus 2 to which the branching power supply path BE supplies power, or may be turned back outside the relay apparatus 2. In addition, the power supply system 1022 may further include an apparatus for turning back the branching power supply path BE, and may be turned back inside the apparatus.

For example, in the present example embodiment, the branching power supply path BE reaches the relay apparatus 2b via the relay apparatus 2a and turns back inside the relay apparatus 2b.

When power is supplied to the relay apparatus 2, the branching power supply path BE causes the current flowing from one side of the trunk power supply path TE to flow to the relay apparatus 2, and then causes the current to turns back so that the current flows to the other side of the trunk power supply path TE.

For example, when the power supply apparatus 32*a* applies a positive voltage to the trunk power supply path TE1 and the power supply apparatus 32*b* applies a negative voltage to the trunk power supply path TE1, the branching power supply path BE causes the current flowing from the power supply apparatus 32*a* to the point P1 to flow to the relay apparatus 2. Then, the current turns back inside the relay apparatus 2 and flows from the point P2 toward the power supply apparatus 32*b*.

The switch circuit S2 is a switch circuit included in the branching apparatus 1. The switch circuit S21 connects or disconnects the points P1 and P2 on the trunk power supply path TE1. The switch circuits S22 and S23 connect or disconnect the trunk power supply path TE and the branching power supply path BE at points P1 and P2, respectively.

When power is supplied to the relay apparatus 2, the switch circuit S21 disconnects the points P1 and P2 on the trunk power supply path TE1. When power is supplied to the relay apparatus 2, the switch circuits S22 and S23 connect the trunk power supply path TE1 and the branching power supply path BE at points P1 and P2, respectively.

When power is not supplied to the relay apparatus 2, the switch circuit S21 connects the points P1 and P2 on the trunk power supply path TE1. When power is not supplied to the relay apparatus 2, the switch circuits S22 and S23 disconnect the trunk power supply path TE1 and the branching power supply path BE at the points P1 and P2, respectively.

The operation of the switch circuit S2 may be controlled by a control unit (not illustrated) included in the branching apparatus 1. That is, when supplying power to the relay apparatus, the branching apparatus 1 may control the switch circuit S2 so as to cause the current flowing from one side of the trunk power supply path to flow to the relay apparatus and cause the current flowing from the relay apparatus to flow to the other side of the trunk power supply path.

<Operation of Power Supply System>

Next, the operation of the power supply system according to the present example embodiment, that is, the power supply method according to the present example embodiment will be described.

Note that, in the following description, FIG. 4 will be continuously referred to.

When power is supplied to the relay apparatus 2, first, the switch circuit S21 disconnects the points P1 and P2 on the trunk power supply path TE1, and the switch circuits S22 and S23 connect the trunk power supply path TE1 and the branching power supply path BE at the points P1 and P2, respectively.

Next, the power supply apparatuses 32*a* and 32*b* output power, the power supply apparatus 32*a* applies a positive voltage to one end of the trunk power supply path TE1, and the power supply apparatus 32*b* applies a negative voltage to the other end of the trunk power supply path TE1.

The positive and negative signs of the voltages applied by the power supply apparatuses 32*a* and 32*b* may be reversed.

Next, a current flows on the trunk power supply path TE1 and the branching power supply path BE, and the branching power supply path BE supplies the current to the relay apparatus 2 and supplies the current.

However, after flowing through the trunk power supply path TE1 from the power supply apparatus 32*a* to the point P1, the current flows to the branching circuit BE via the switch circuit S22. The current turns back at the relay apparatus 2*b*, flows to the point P2 via the switch circuit S23, and flows from the point P2 to the power supply apparatus 32*b*.

Note that the current may be supplied to the relay apparatus 2 before being turned back, or may be supplied to the relay apparatus 2 after being turned back.

As described above, the power supply system according to the present example embodiment supplies power to the relay apparatus inserted into the branching submarine cable by the branching power supply path connected to the trunk power supply path.

Since the power supplied to the relay apparatus is output by the power supply apparatus connected to the trunk power supply path, the branching power supply path does not need to be directly connected to the power supply apparatus in the power supply system according to the present example embodiment.

That is, the power supply system according to the present example embodiment can simplify equipment for supplying power to the relay apparatus on the branched submarine cable.

In addition, according to the power supply system according to the present example embodiment, since it is not necessary to provide a landing station at the end of the branching submarine cable, two systems of trunk submarine cables can be connected by the branching submarine cable.

Although the present disclosure has been described in accordance with the above example embodiment, the present disclosure is not limited to the configuration of the above example embodiment, and includes various modifications, modifications, and combinations that can be made by those skilled in the art within the scope of the claims of the present application.

REFERENCE SIGNS LIST

1, 1*a*, 1*b* BRANCHING APPARATUS
2, 2*a*, 2*b* RELAY APPARATUS
3, 3*a* to 3*d* LANDING STATION
1001, 1022 POWER SUPPLY SYSTEM
1002 SUBMARINE CABLE SYSTEM
1021 TRANSMISSION SYSTEM
TL1, TL2 TRUNK SUBMARINE CABLE
BL BRANCHING SUBMARINE CABLE
TT1, TT2 TRUNK TRANSMISSION PATH
BT1, BT2 BRANCHING TRANSMISSION PATH
TE, TE1, TE2 TRUNK POWER SUPPLY PATH
BE BRANCHING POWER SUPPLY PATH
S11 to S14, S21 to S23 SWITCH CIRCUIT

What is claimed is:

1. A power supply system comprising:
two systems of trunk submarine cables,
two branching apparatuses, and
at least one relay apparatus, wherein:
    the power supply system is configured to supply power to the at least one relay apparatus on a branching submarine cable, the branching submarine cable is branched from one trunk submarine cable of the two systems of trunk submarine cables by one branching apparatus of the two branching apparatuses,
    power is supplied to the at least one relay apparatus by a branching power supply path connected only to a trunk power supply path provided in the one trunk submarine cable, and
    when power is supplied to the at least one relay apparatus, the branching power supply path enables a current flowing from one side of the trunk power supply path to flow to the at least one relay apparatus, and then enables the current to turn back so that the current flows to the other side of the trunk power supply path.

2. The power supply system according to claim 1, wherein the one branching apparatus comprises:

a first switch circuit on the trunk power supply path; and at least one second switch circuit on the branching power supply path;

the first switch circuit is configured to disconnect the trunk power supply path when power is supplied to the at least one relay apparatus, and wherein the at least one second switch circuit is configured to connect the trunk power supply path and the branching power supply path when power is supplied to the at least one relay apparatus.

3. The power supply system according to claim 2, wherein the at least one second switch circuit is configured to disconnect the trunk power supply path and the branching power supply path when power is not supplied to the at least one relay apparatus.

4. The power supply system according to claim 1, wherein the branching power supply path comprises a multi-cable comprising a first conductive wire that enables a first current to flow from one side of the trunk power supply path to the at least one relay apparatus, and a second conductive wire that enables a second current to flow from the at least one relay apparatus to the other side of the trunk power supply path.

5. The power supply system according to claim 1, wherein the branching power supply path is turned back inside the at least one relay apparatus.

6. A power supply method comprising:

supplying power to at least one relay apparatus on a branching submarine cable, the branching submarine cable is branched from one trunk submarine cable of two systems of trunk submarine cables by one branching apparatus of two branching apparatuses, the two systems of trunk submarine cables and the two branching apparatuses are included in a power supply system, wherein:

power is supplied to the at least one relay apparatus by a branching power supply path connected to only to a trunk power supply path provided in the one trunk submarine cable, and when power is supplied to the at least one relay apparatus, the branching power supply path enables a current flowing from one side of the trunk power supply path to flow to the at least one relay apparatus, and then enables the current to turn back so that the current flows to the other side of the trunk power supply path.

7. The power supply method according to claim 6, wherein the one branching apparatus comprises:

a first switch circuit on the trunk power supply path; and at least one second switch circuit on the branching power supply path; and the power supply method comprises:

opening the first switch circuit to disconnect the trunk power supply path when power is supplied to the at least one relay apparatus; and closing the at least one second switch circuit to connect the trunk power supply path and the branching power supply path when power is supplied to the at least one relay apparatus.

* * * * *